No. 810,186. PATENTED JAN. 16, 1906.
J. CALDER.
SHOCKING ATTACHMENT FOR HARVESTER BINDERS.
APPLICATION FILED JULY 9, 1902.

Witnesses.
H. J. S. Young.
L. Trimble.

Inventor:
J. Calder

No. 810,186. PATENTED JAN. 16, 1906.
J. CALDER.
SHOCKING ATTACHMENT FOR HARVESTER BINDERS.
APPLICATION FILED JULY 9, 1902.

Witnesses
Inventor

No. 810,186. PATENTED JAN. 16, 1906.
J. CALDER.
SHOCKING ATTACHMENT FOR HARVESTER BINDERS.
APPLICATION FILED JULY 9, 1902.

No. 810,186. PATENTED JAN. 16, 1906.
J. CALDER.
SHOCKING ATTACHMENT FOR HARVESTER BINDERS.
APPLICATION FILED JULY 9, 1902.

Witnesses.

Inventor:
J. Calder

No. 810,186. PATENTED JAN. 16, 1906.
J. CALDER.
SHOCKING ATTACHMENT FOR HARVESTER BINDERS.
APPLICATION FILED JULY 9, 1902.

No. 810,186. PATENTED JAN. 16, 1906.
J. CALDER.
SHOCKING ATTACHMENT FOR HARVESTER BINDERS.
APPLICATION FILED JULY 9, 1902.

Witnesses.
Inventor.

No. 810,186. PATENTED JAN. 16, 1906.
J. CALDER.
SHOCKING ATTACHMENT FOR HARVESTER BINDERS.
APPLICATION FILED JULY 9, 1902.

No. 810,186. PATENTED JAN. 16, 1906.
J. CALDER.
SHOCKING ATTACHMENT FOR HARVESTER BINDERS.
APPLICATION FILED JULY 9, 1902.

Witnesses
H. Y. S. Young
G. S. Bate

Inventor:
J. Calder
by Fred. B. Fetherstonhaugh
atty

UNITED STATES PATENT OFFICE.

JAMES CALDER, OF HAMILTON, CANADA, ASSIGNOR OF ONE-HALF TO GEORGE SHELDON BINGHAM, OF HAMILTON, CANADA.

SHOCKING ATTACHMENT FOR HARVESTER-BINDERS.

No. 810,186.  Specification of Letters Patent.  Patented Jan. 16, 1906.

Application filed July 9, 1902. Serial No. 114,932.

*To all whom it may concern:*

Be it known that I, JAMES CALDER, pattern-maker, of the city of Hamilton, in the county of Wentworth, in the Province of Ontario, Canada, have invented certain new and useful Improvements in Shocking Attachments for Harvester-Binders, of which the following is the specification.

My invention relates to improvements in shocking attachments for harvester-binders; and the object of the invention is to devise a simple, light, and efficient attachment of this class which may be secured and held on the frame of a binder without in any manner altering the construction of such frame and in which the bound sheaves will be delivered from the binder-deck in proper form to form a perfect shock and parallel with the side of the binder-deck and in which also the shock when bound will be precipitated, with the butts of the sheaves, upon the ground in such a manner that when finally delivered the shock-carrier will be caused to recede close to the side of the machine, so that the shock is left standing without any danger of it being knocked over by the shock-carrier and yet whereby such shock-carrier will resume its normal position as soon as the shock has been passed ready to receive the next shock.

The invention includes the construction and arrangement of the various parts, as hereinafter described, and particularly pointed out in the claims.

It is illustrated in the accompanying drawings, in which—

Fig. 1ª is a detail sectional view of the aprons. Fig. 3 is a section looking from the front of the machine and immediately in front of the forward arm of the shock-carrier, showing the relative position of the knotter mechanisms, carrier-arms, and shock-carrier.

In the drawings like characters of reference indicate corresponding parts in each figure.

A is the binder-deck of an ordinary harvester-binder, which is of the usual construction and held on tubular supports A' A' by suitable brackets, which it is not necessary here to describe.

B is the end casting of the knotter mechanism, which is suitably secured on the front end of the binder-deck and supported on the frame thereof.

C is the knotter-shaft, on which the ordinary knotter mechanism is supported, which it is not necessary here to describe.

Figure 1:
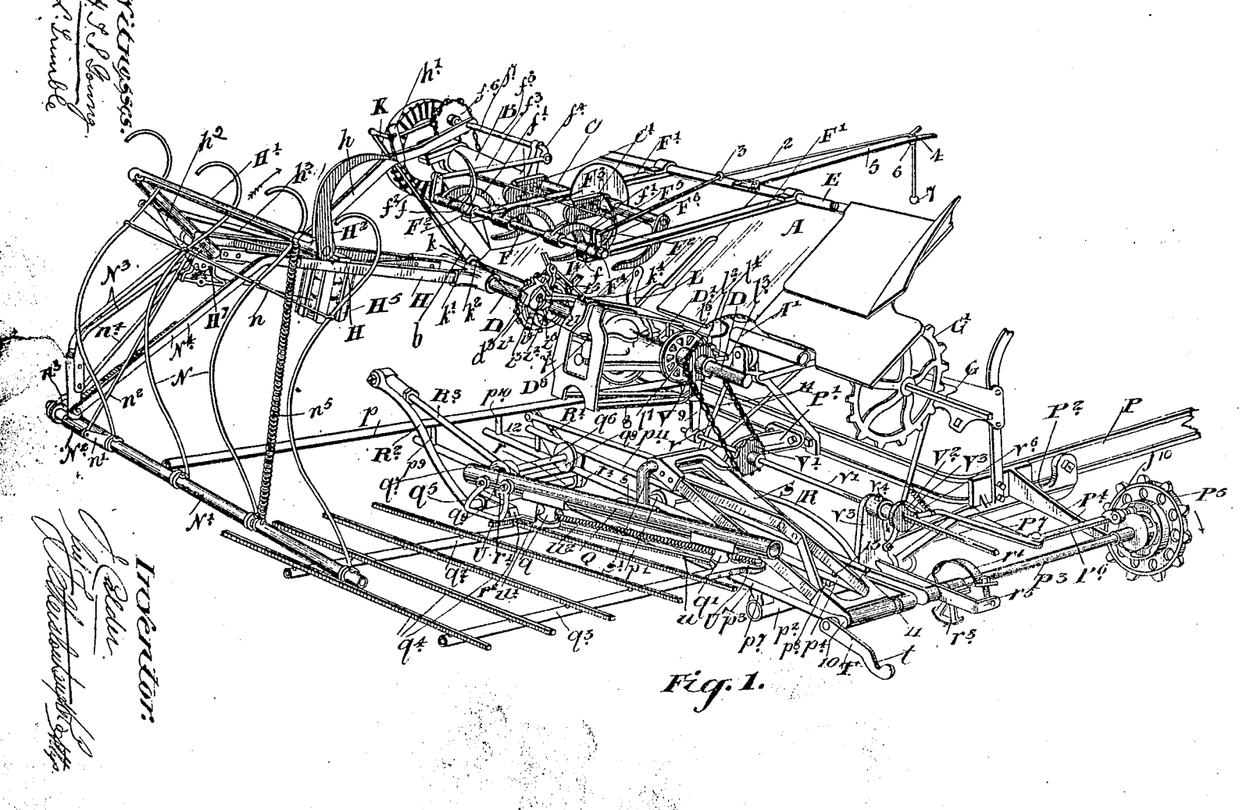
Figure 1 is a general perspective view from the rear of the machine, showing the construction and arrangement of my shocking attachment, the confining extension-deck and aprons being removed.

D is the shock-knotter shaft, which is supported in suitable bearings formed by the casting carrying the shock-knotter mechanism and designated D' at the rear end of the binder-deck and at the front in a bearing-bracket D², secured to the binder-deck and in bearings at the end of the bar D³, which is supported upon the tubular supporting-bars A' of the binder-deck. (See Figs. 1 and 3.)

E is a bar supported in suitable brackets above the upper edge of the binder-deck.

F is a supplemental ejector-arm spindle, which is journaled in suitable bearings $f$ on the outer ends of the bars F', which are secured at the inner end on the bar E. One of the bars F', it will be noticed, extends across the knotter-shaft, which forms a support for the same, so as to rigidly hold the supplemental ejector-arm spindle in position. This spindle has secured to it the supplemental arms $f'$.

C' represents the ejector-arms secured on the ordinary knotter-shaft and with which the arms $f'$ are designed to coact, so as to deliver the sheaf from the binder-deck onto the shock-carrier, as will hereinafter appear.

The spindle F is provided at the front end with an arm $f^2$, which is connected by a rod $f^3$ to a crank $f^4$, secured on the end of the rod $f^5$, which is journaled in bearings attached to the casting through which the knotter-shaft extends.

$f^6$ is a sprocket-wheel secured on the front end of the rod $f^5$. The sprocket-pinion $f^6$ is connected by a chain $f^7$ to a pinion $f^8$ on the end of the packer-shaft G, from which it will therefore be seen the spindle is oscillated in order to give a forward and backward throw to the supplemental arms $f'$.

F² represents retarding-arms connected together by the rod F³ and loosely held on the spindle F, being securely held up by means of the spring F⁴, which projects against a pin F⁵ on the arm F⁶, which forms part of the hub of the supplemental carrier-arm F². The arm F⁶ forms a part of the hub of the retarding-arm F²; which is loosely held upon the shaft F and has connected to it a cord 2, which passes through an eye 3 on the bar E and extends through a crotch 4 on the bar 5, which extends out at right angles to the bar E. The cord 2 is provided with balls or knobs 6 and 7. By releasing the ball 6 from the crotch 4 the spring F⁴ will force the arm F² down into the position shown by dotted lines in Fig. 3, the exact position being limited by the ball 7.

It will now be seen that the mechanism I have so far described—viz., the ejector-arms C' and the supplemental carrier-arms $f'$—serve to deliver the sheaf of the binder-deck onto the shock-carrier, which I shall presently describe. Should the sheaf be liable to be delivered too quickly before the shock is tied and delivered, the cord 2 may be released, as hereinbefore described, so as to throw the ball 7 against the crotch 4, when the supplemental retarding-arms F² will pass down into the position shown in dotted lines and retard the delivery of the sheaf, and the driver of the machine will be enabled to retard the delivery of the sheaf until the shock is delivered. It will also be understood that the sheaf is tied in the usual manner by the ordinary knotter and cord from the needle, which I do not here describe or show, as it forms no feature in the present invention.

Figure 2:
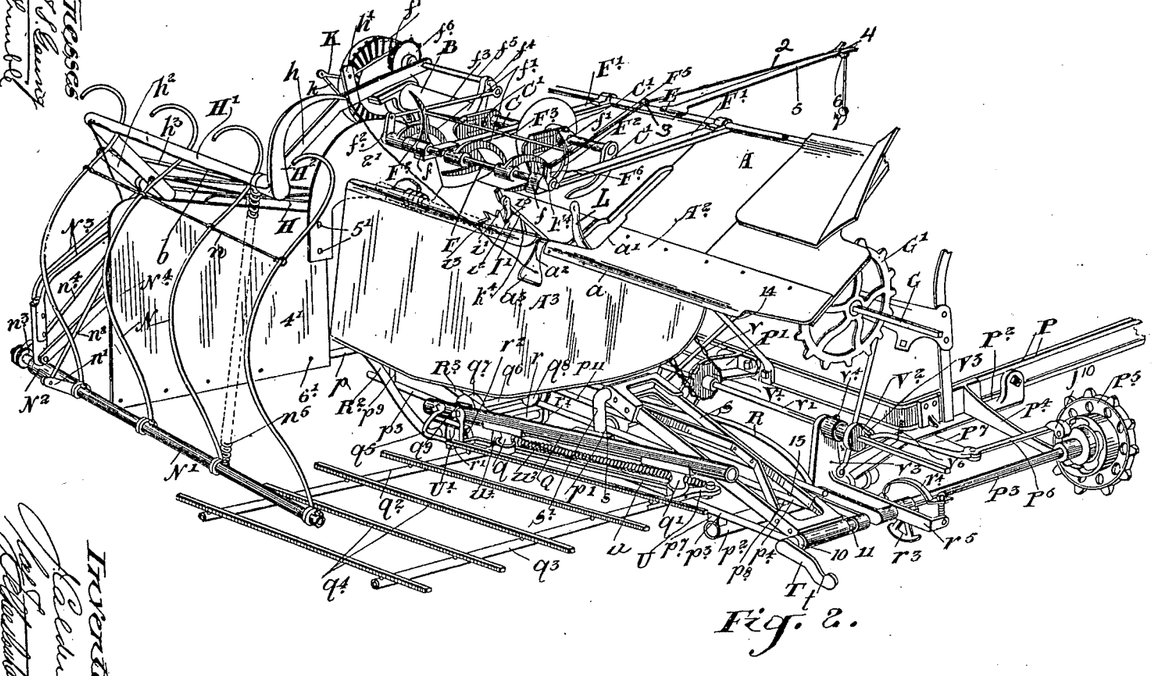
Fig. 2 is a similar view to Fig. 1, showing the confining extension-decks and aprons in position.

A² represents aprons, made, preferably, of sheet metal and secured at the lower portion of the binder-deck. The aprons A² are broad V shape in cross-section and are provided with depending lips $a$, which are preferably made of sheet metal and suitably secured to the depending apron A³. (See Fig. 2.) The aprons A² and A³ have slots $a'$ and $a^2$ made in them to provide for the working of the compressor-arm and needle of the knotter, as hereinafter will appear. The apron A³ is also provided with a slot $a^3$, through which the numbering mechanism may be viewed.

H is an extension-arm which is supported at the inner end on the shock-knotter shaft D and is supported at the outer end by a brace $h$, secured to one of the side bars of the frame at the bottom and having the spindle $f^5$ extending therethrough at the top.

Figures 5, 12:
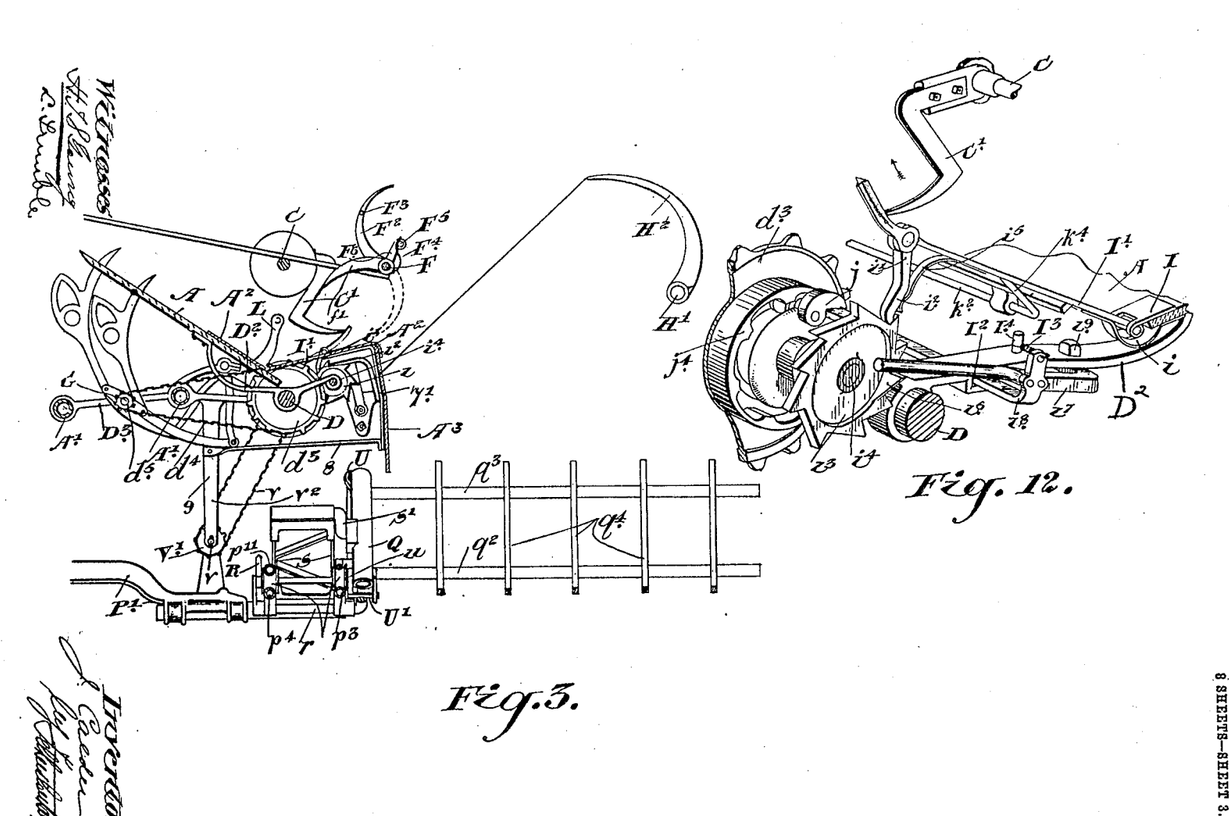
Fig. 5 is a similar view showing the the shock-carrier folded up, so as to clear the shock as the machine is being driven forward past it.
Fig. 12 is an enlarged detail showing the controlling-wheel for regulating the number of sheaves in the shock and the mechanism coacting therewith and also the inner compressor-arm and means for operating the same.
Figure 5:
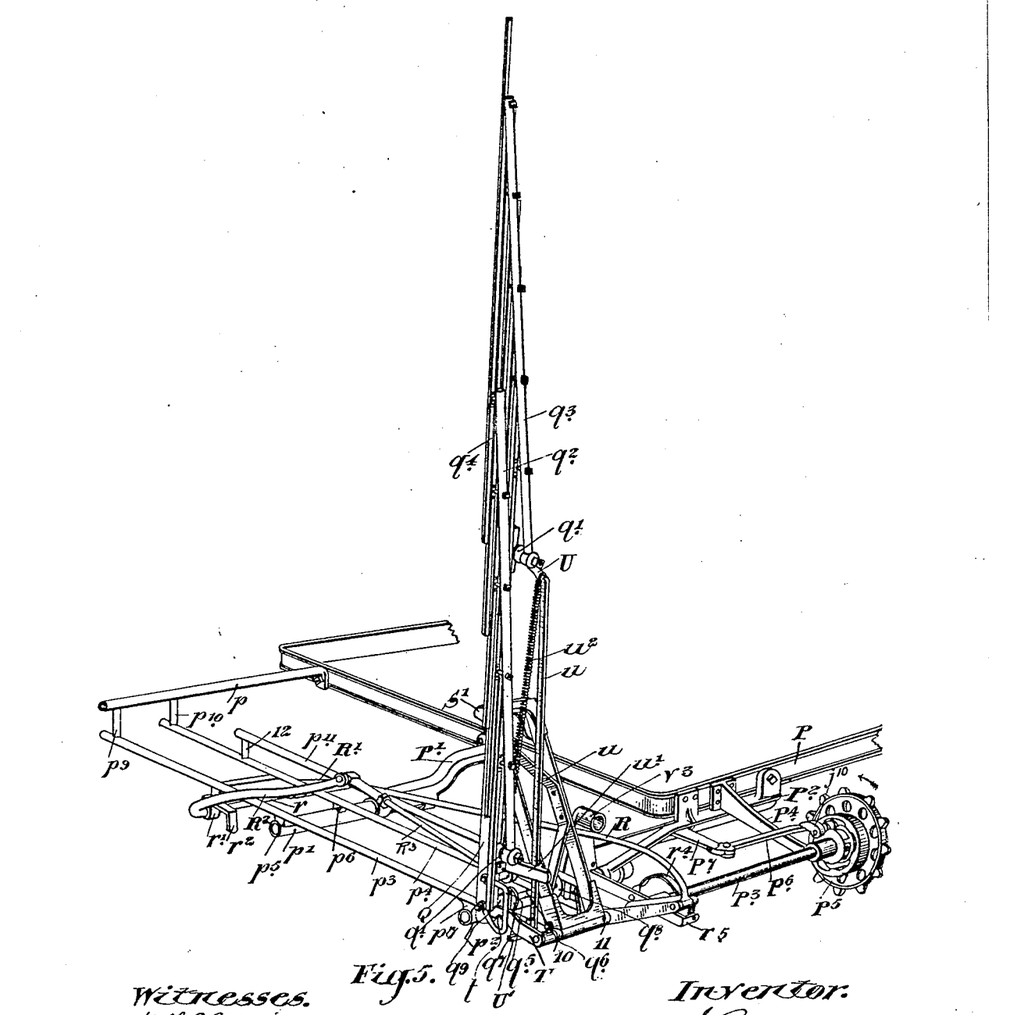

When the sheaf is being ejected from the binder-deck, I find that it is necessary to provide a counter whereby the exact number of sheaves necessary to form a shock may be counted and gaged, so that the mechanism for tying the shock may be set in motion. In order to effect this purpose, I provide the following mechanism: I is a plate (see Fig. 12) secured to the binder-deck and provided with a forked bearing in which is journaled the end of the bar I', which is held in the position indicated by means of a spring $i$, secured underneath the plate and extending underneath the bar. $i'$ is an arm pivotally held on the free end of the bar I' and having a depending portion $i^2$. $i^3$ is a counter-wheel provided, preferably, with eight ratchet-teeth, corresponding in number to the sheaves of the shock. The counter-wheel $i^3$ is journaled on a pin $i^4$, attached to or forming part of the bearing-bracket D². $i^5$ is a spring which is secured to the bar I' and designed to normally press against the depending portion $i^2$ of the arm $i'$. $i^6$ is a laterally-projecting ratchet-shaped tooth attached to or forming part of the counter-wheel $i^3$. $i^7$ is a lever secured intermediate of its length to the bent end of the bar $i^8$ and pivoted on the bracket D² by the bolt $i^9$. The bar $i^8$ extends through a guide I² and passes at the opposite end normally underneath the trip-dog $j$, where it is held by means of the spring I³, connected to the bent end and to a pin I⁴ on the bracket D².

$d^3$ is a sprocket-wheel which is loosely held on the knotter-shaft D and is connected by a sprocket-chain $d^4$ to a pinion $d^5$ on the packer-shaft G, which is driven from the main driving-wheel through the sprocket-wheel G' and suitable chain connections and gear.

Figures 13, 14, 15, 16:
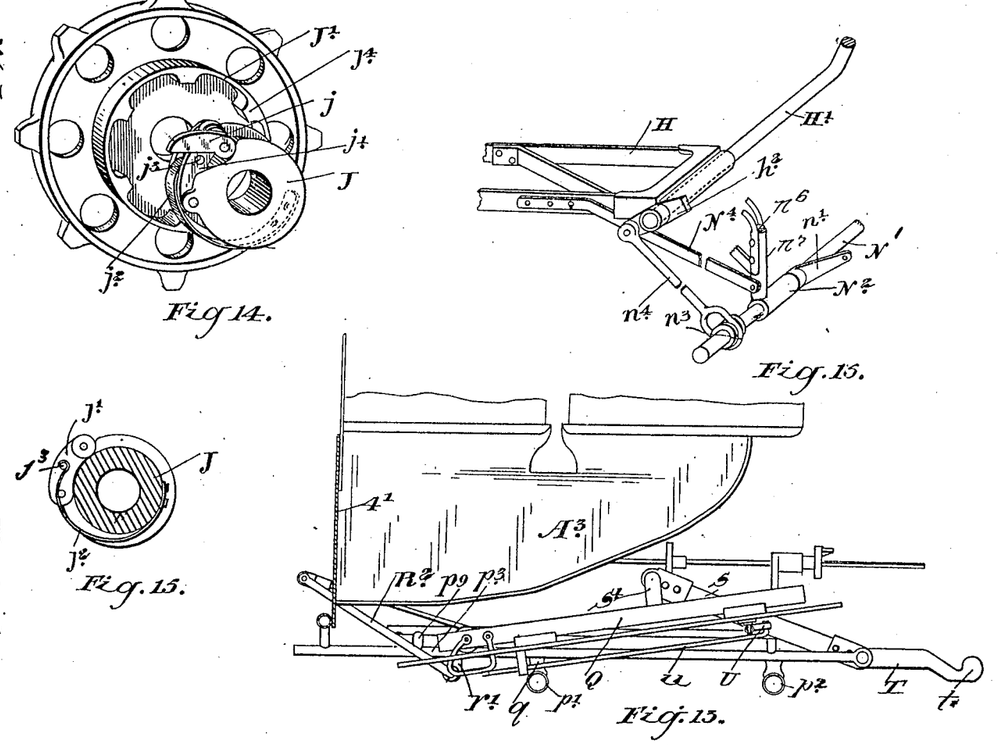
Fig. 13 is a detail view showing the relative positions of the aprons.
Figs. 14 and 15 are detail views to further illustrate the parts shown in Fig. 10.
Fig. 16 is a detail view of the pivoted portion of arm H'.

The trip-dog $j$ is secured on the end of the arm $j'$, (see Figs. 10, 14, and 15,) which is pivoted on the collar J, secured to the knotter-shaft. The arm $j'$ has a normal outward pressure exerted on it by the spring $j^2$, which is secured to the collar and extends against a pin $j^3$ on the arm $j'$. The spindle $f^5$ carries at the front end the sprocket-wheel $f^6$, as hereinbefore described. A clutch mechanism provided with a dog $f^9$ connects the sprocket $f^6$ and shaft $f^5$ together.

Figures 7, 8, 11:
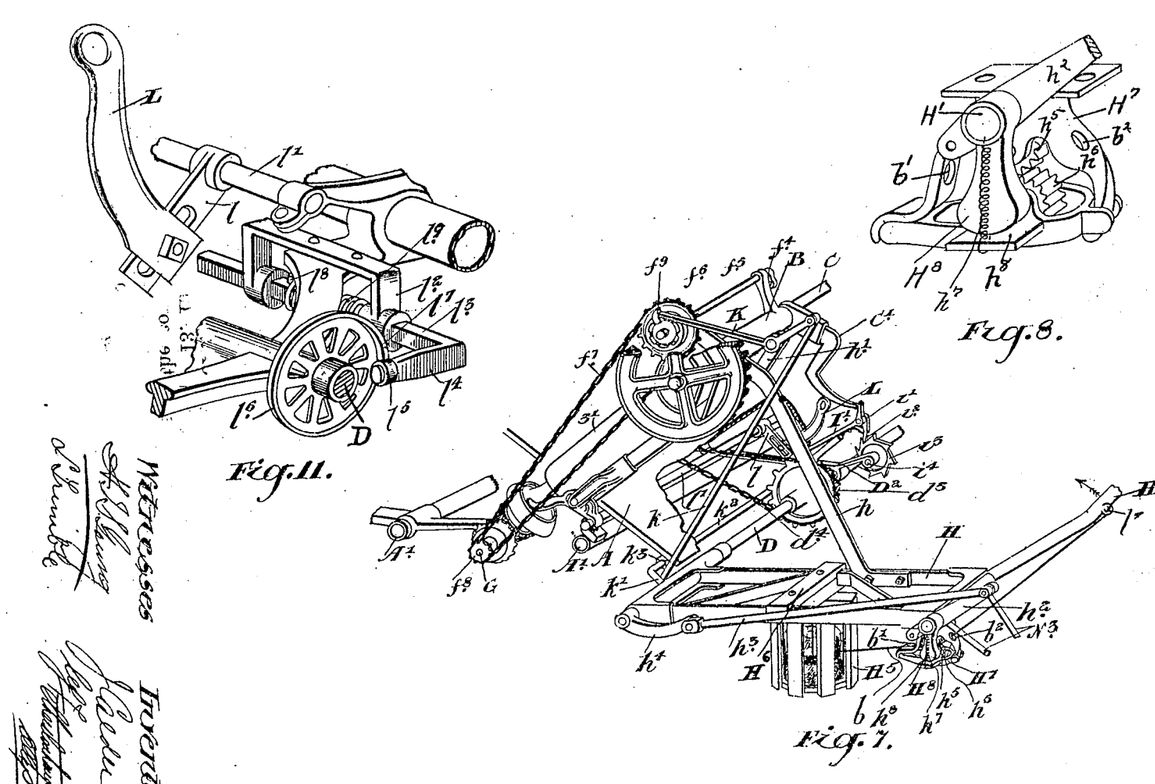
Fig. 7 is a perspective front view of the extension-frame, showing the manner of operating the needle and the tension device and means for regulating the same.
Fig. 8 is an enlarged detail of the tension device.
Fig. 11 is a detal of the device whereby the trip-arm or ordinary binding mechanism is held stationary during the period that the shock is being tied.

K is a bent lever pivoted on the bar $h'$, attached to or forming part of the brace $h$. The outer end of the lever K is pivotally connected by the rod $k$ to an arm $k'$, formed on the end of the spindle $k^2$, which is journaled in bearings $k^3$ beneath the binder-deck, as indicated in Fig. 7. The inner end of the lever K normally projects against the dog $f^9$. The clutch operated through the dog $f^9$ is similar to that shown in Figs. 9 and 10 of the drawings. The lever K acts on the dog $f^9$ to free the sprocket-wheel $f^6$ in a similar manner to the bar $p^6$ on the dog $j$ to free the sprocket-wheel P$^5$. It will be seen that while the lever K is in contact with the dog $f^9$ the sprocket-wheel $f^6$ is free to rotate loosely on the shaft $f^5$, and therefore will not interfere with the rotation of the packer-shaft G. As soon, however, as the lever K is tilted on its pivot away from the dog $f^9$ the shaft $f^5$ and sprocket-wheel $f^6$, being brought into connection through the clutch, are driven from the packer shaft G until the bar K is again brought into the path of the dog $f^9$ to throw the clutch out of gear and free the wheel $f^6$. The sheaf-binding knotter-shaft is driven in the usual manner or any suitable manner from the packer-shaft, which it is not necessary here to describe.

One of the ejector-arms C' in its rotation strikes the arm $i'$, thereby forcing it downwardly sufficiently so as to allow the sheaf to pass over the arm $i'$, and at the same time depresses, by means of the depending portion $i^2$, the tooth of the counter-wheel the space of one tooth, the spring $i^5$ being of sufficient strength to hold the dog $i^2$ on the face of the tooth, but allowing it to ride over the tooth on its return movement. The arm I' is also carried downwardly against the pressure of the spring $i$ and strikes the arm $k^4$ on the rear end of the spindle $k^2$, thus pulling downwardly upon the rod $k$ and tilting the lever K so as to throw the inner end out of engagement with the dog $f^9$, and thereby lock the sprocket-wheel $f^6$ to the spindle $f^5$, and thereby rotate the spindle and impart an oscillating movement to the supplemental carrier-arms $f''$, so as to throw out the sheaf upon the shock-carrier, which I shall presently describe. As soon as the requisite movement has been given the ejector-arms C' of the knotter-shaft cease to rotate, the arm $i'$ is restored to its normal position by means of the spring $i$, extending underneath the bar I', the lower depending portion of such arm springing and passing back over on to the next succeeding tooth ready for the next operation. The inner end of the lever K of course passes back into its normal position against the dog $f^9$ by reason of the weight of its long arm. Upon the eight sheaves being precipitated into the shock-carrier the tooth $i^6$ comes in contact with the outer end of the lever $i^7$, thereby forcing the bar $i^8$ from underneath the trip-dog $j$, thus throwing the arm $j'$ against one of the teeth $j^4$ of the collar J', secured to or forming part of the sprocket-wheel $d^3$, and thereby throwing such sprocket-wheel into operative connection with the shock-knotter shaft D, thus transmitting motion from the packer-shaft to the shock-knotter shaft to operate the shock-knotter mechanism. It will be understood that previous to the operative connection being thrown in that as the packer-shaft is continually rotating so likewise will the sprocket-wheel $d^3$ and that the shock-knotter shaft will only be caused to rotate when the trip mechanism described above is thrown in.

L is a compressor-arm which is operated in the usual manner by the pressure of the grain in order to throw into gear the drive between the packer-shaft and the knotter-shaft. In order to tie the shock, it is necessary that this compressor-arm be momentarily held until the cord binding the shock together has been tied. (See Fig. 11.) In order to effect this, I provide the following simple mechanism: The compressor-arm L is adjustably secured on an arm $l$, secured to the cross-shaft $l'$. $l^2$ is a bracket secured to portion of the bearing-bracket supporting the shock-knotter shaft. The bracket $l^2$ carries a cross-bar $l^3$, with a bent end $l^4$, provided with a roller $l^5$. $l^6$ is a cam-wheel on the shock-knotter shaft provided with one rise $l^7$. The front end of the bar $l^3$ extends normally into proximity with the compressor-arm L, being held from underneath the path of such compressor-arm by the rise $l^7$ of the cam-wheel $l^6$. The cam-wheel $l^6$ is placed on the shock-knotter shaft D, so that as soon as the shock-knotter shaft has rotated in its revolution to such an extent as to be in a position to tie the knot by its knotter the rise $l^7$ in the cam-wheel $l^6$ reaches the point where the roller $l^5$ passes the end of the rise, and thereby the rod $l^3$ is caused to spring inwardly underneath the compressor-arm by the spring $l^9$, and thereby the compressor-arm is held stationary and prevents the ejection of any more grain during the period that the knot is being tied on the cord of the shock and such cord severed, inward movement of the rod being limited by a stop $l^8$. When the compressor-arm is locked so as to hold the bundle, the ejector-arms are stationary, such arms only being brought into operation by the compression of the compressor-arm by means of the packer-arms forcing the bundle forward. By the compression of the compressor-arm the compressor-shaft is turned, thereby operating a suitable clutch mechanism connecting such shaft to the mechanism operating the knotter-shaft C, on which the ejector-arms are secured. These arms make one revolution. Then the clutch drops out of gear. By locking the compressor-arm a little more straw is gathered into the bundle before the knot is tied and the ejector-arms operate. It will be seen, therefore, that the ejector-arms never come in contact with the bundle until the compressor-arm is compressed by the packer-arms, so that the locking of the arm will not interfere with the working of the rest of the mechanism.

I consider it necessary in my machine to provide a shield for confining the grain or preventing it from passing too far forward on the binder-deck, and for this purpose I provide a shield $2'$, which I secure to the ordinary knotter-shaft. I also suitably secure a shield $4'$ to said shield $2'$ by suitable rivets $5'$ at the inner end, such shield being also secured to the extension-bar $p$ by suitable bolts or rivets $6'$, extending through the same.

The aprons $A^2$ and $A^3$ are braced and supported for the most part by the bracket $7'$, substantially L shape in form and suitably secured underneath the binder-deck and connected at the bottom by the bars 8 to the down-hanger 9, which is attached to or forms part of the bearing bracket or bar $D^3$, supported upon the tubes $A'$ $A'$.

$H'$ is the needle-arm, which is of the shape shown, the lower horizontal end being journaled in suitable bearings at the outer end of the frame H. The needle $H^2$ is secured at the rear end of the arm $H'$. The requisite movement is given to the needle, so as to carry it in through the slot $a^2$ into the shock-knotter $D^6$ by an arm $h^2$, which is connected by a rod $h^3$ to an arm $h^4$ on the end of the shock-knotter shaft D, which, as hereinbefore described, passes through the inner end of the frame H.

In order to provide for the tension and loosening of the cord that passes through the needle to the knotter, so as to allow enough cord for the shock, and yet tighten the cord when the knot is being tied, I provide the following simple device: $H^5$ is a cord-holding cage secured to the cross-bar $H^6$, extending between the bars of the extension-frame H. $H^7$ is a bracket securely riveted to the end of the front side bar of the frame H in proximity to the end of the needle-arm. $H^8$ is an arm attached to the end of the needle-arm and designed to move with said needle-arm or in unison with the arm $h^2$. $h^5$ and $h^6$ are corrugated rollers suitably journaled in the bracket $H^7$ and held together by the spring $h^7$. (See Figs. 7 and 8.) $h^8$ is a lug projecting laterally from the bracket $H^7$, as indicated. The cord $b$ passes through the eye $b'$, between the rollers $h^5$ and $h^6$, through the eye $b^2$ in the bracket $H^7$ to an eye $b^3$ in the needle-arm, and thence to the needle. When the needle-arm is thrown in the direction indicated by arrow, Fig. 7, so as to throw the needle into the knotter, the arm $H^8$ is thrown from off the lug $h^8$ and the spring $h^7$ forces the corrugated rollers $h^5$ and $h^6$ together, thereby causing a tension to be put on the cord when the shock is being bound. When the needle-arm and needle have been thrown back into the position shown in Figs. 1, 2, and 7, the cam-shaped end of the arm $H^8$ comes in contact with the lug $h^8$, so that the rollers $h^5$ and $h^6$ are forced apart and the cord is freed. Consequently when the first sheaf is being precipitated onto the shocker, as hereinbefore described, it will carry down the cord, (shown in Figs. 1 and 2,) as such cord is quite free to pass downwardly onto the top of the shock-carrier, so that each succeeding sheaf will lie on top of the cord. When the needle is giving its forward throw again, the tension is, as hereinbefore described, put on the cord, so that it tightens up on the shock, and when the cord is tied the shock is bound tightly in a similar manner to the way the ordinary sheaf would be bound by the ordinary binder-knotter.

N represents compressor-fingers substantially S shape in form and secured to a bar $N'$, which is journaled in a socket $N^2$, held on the end of the bars $N^3$, secured to the outer end of the extension-frame. The compressor-fingers N are bound together by a cross-bar $n$.

$N^4$ is a brace connected to a sleeve $n^7$, held loosely on a pin $n^6$, forming part of the socket $N^2$ at the lower end and suitably secured to the rear side of the extension-frame at the upper end, so as to form with the bars $N^3$ a rigid supporting-journal for the forward end of the bar $N'$.

$n'$ is an arm secured on the bar $N'$ and connected by a rod $n^2$ to the needle-arm.

$n^3$ is an arm secured on the front end of the bar $N'$ and connected by a rod $n^4$ to the lower end of the arm $h^2$. The rod $n^4$ has a slotted end fitting within a grooved collar on bar $N'$, thus allowing a free rotary movement, as well as a swinging motion. By this mechanism the free end of the arm $N'$ is given a grainward movement at the same time that the arm $N'$ is turned to depress the compression-fingers N. By this movement the compressor-fingers N compress the shock evenly at both the thick or butt end of the shock and at the thin or head end of the shock.

$n^5$ is a spiral spring connected to the needle-arm in proximity to the needle at the upper end and at the lower end to the bar $N'$.

It will now be seen that upon every forward movement of the needle the compressor-fingers will be carried inward and downward simultaneously, so as to compress the sheaf upon the shock-carrier O, which is supported as hereinafter described, and thereby enable the shock to be tied a maximum tightness. The spiral spring $n^5$ serves to hold or, more properly, draw the rear end of the bar N' inwardly, and consequently the fingers N downwardly, during the above operation, so as to press the head of the grain evenly and reduce the diameter of the shock at the top, so that it will stand when put on the ground.

Having now described the mechanism for carrying the sheaves onto the shock-carrier and also the means for compressing the shock on such carrier, &c., I shall now describe the mechanism whereby the shock-carrier is tilted to deliver the shock upon the ground and folded to pass such shock when delivered as the machine moves forward and finally restore it to its normal position again ready to receive the next shock.

P is a portion of the main frame of the harvester, and P' and P² are laterally-extending bars which are suitably secured to the side and end of the main frame of the harvester, respectively, and to which the tubular extensions $p'$ and $p^2$ are secured.

$p$ is a bar secured to the side of the frame, near the front end thereof, as indicated.

$p^3$ and $p^4$ are tubular rails which are supported and held by brackets $p^5$ and $p^6$ on the tubular extension $p'$ and by brackets $p^7$ and $p^8$ on the tubular extension $p^2$. The front end of the tubular rails $p^3$ and $p^4$ are connected by uprights $p^9$ and $p^{10}$ to the bar $p$. The rear end of the rails $p^3$ and $p^4$ form journals 10 and 11, in which the crank-shaft P³ has bearings at the outer end, such crank-shaft having bearings at the inner end on the bearing-bracket P⁴, secured to the main frame of the harvester P.

Figures 9, 10:
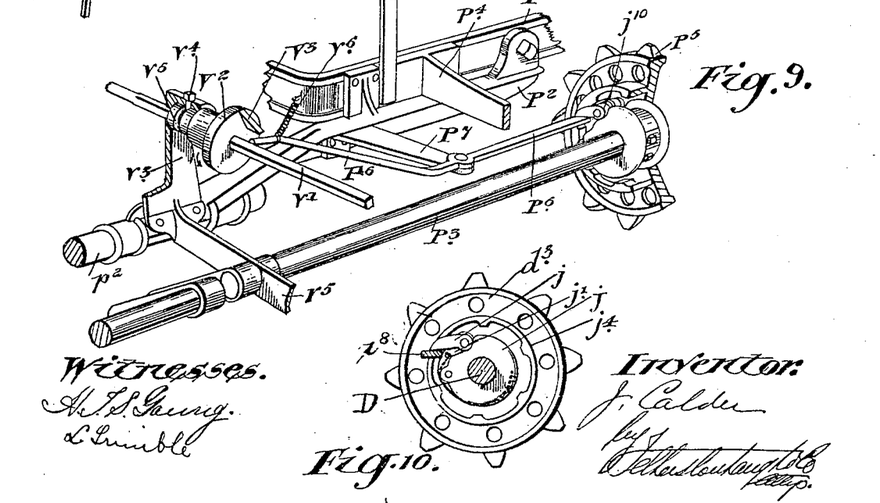
Fig. 9 is a detail of the driving means for the pitman operating the shock-carrier and trip means connected with the same, whereby such driving means is thrown periodically into operation.
Fig. 10 is a detail of clutch for driving means.

P⁵ is a sprocket-wheel loose on the crank-shaft P³ and provided with the same form of trip mechanism exactly as is shown in Fig. 10 and as hereinbefore referred to, the trip-dog $j^{10}$ being in this instance engaged by the end of the bell-crank bar P⁶, pivoted on a bracket P⁷, secured to the bar P².

$p^{11}$ is a guard-rail secured on the rail $p^4$ by stems 12 and 13. The purpose of the guard-rail is to prevent the wheels $g^7$ and $g^8$ of the carriage of the shock-carrier from leaving the rails $p^3$ and $p^4$.

14 represents braces extending between the bar P' and the cross-strut 15, secured to a portion of the main frame of the harvester, as indicated, such braces being designed to strengthen the connection of the bar P' to the main frame of the harvester P.

Q is a tubular bar which has connected to it the brackets $q$ and $q'$, on which are pivotally journaled or swiveled at the inner ends the cross-bars $q^2$ and $q^3$, which extend outwardly, as shown, and have pivotally connected to same the longitudinal slats $q^4$. The front end of the bar Q has secured thereto a bracket $q^5$, the straight edge of which is designed to form a guide, as will hereinafter appear. The L-shaped bend of the rod $u$ extends beneath the bracket $q^5$, and thus when such L-shaped bend strikes the stop $r^2$ during the downward swing of the shock-carrier it is prevented from being bent in an upward direction by coming in contact with the bracket $q^5$; otherwise the bar $u$ would bind in the guiding-block $u'$.

$q^6$ is an axle carrying the grooved wheels $q^7$ and $q^8$, which are designed to ride upon the rails $p^3$ and $p^4$. The axle $q^6$ is suitably held in the front end of the bar Q.

R is a rod connected to the double crank of the shaft P³ at one end and to an arm R' on the end of the short counter-shaft $r$, which is journaled in suitable bearings $r'$.

R² is an arm connected to the outer end of the shaft $r$, the outer end of the arm R² being connected by the pitman R³ to the inner side of the bar Q, to which such pitman is pivotally connected.

S is a rectangular frame pivotally swung on the end of the shaft P³. The free end of the rectangular frame S has journaled in it the crank-bar S', the end of the crank of which is journaled in bearings $s$, secured to the bar Q.

T is an arm secured on the outer end of the shaft P³ and provided with a notch $t$.

U is a bracket secured on the pivoted end of the bar $q'$, and $u$ is a bar pivoted in such bracket and extending through a guiding-block $u'$, secured to the lower side of the bar Q in proximity to the pivot of the bar $q^2$. The free end of the bar $u$ is provided with an L-shaped bend U'.

$u^2$ is a spiral spring connecting the bracket U to the bar $q^2$. The spring $u^2$ merely acts to counterbalance the weight of the carrier and is not of sufficient strength to raise it, yet when the carrier is brought to its raised position the spring will be of sufficient strength to prevent the vibration of the machine shaking the carrier down.

V is a sprocket-wheel secured to the shock-knotter shaft D and connected by the sprocket-chain $v$ to a sprocket-wheel V' on the trip-spindle $v'$, which is journaled at the front end in the down-hanger 9, attached to or forming part of the binder-deck frame, and at the rear end in the bracket $v^3$, attached to or forming part of the bar P².

V² is the trip-wheel, which is provided with a face-tooth V³, such trip-wheel being secured on the square end of the spindle $v'$ and being held from longitudinal displacement by a set-screw $v^4$, extending into an annular groove $v^5$ in the hub of the trip-wheel V².

$v^6$ is a spiral spring connecting the end of the crank-arm P⁶ to the main frame of the harvester P.

$r^2$ is a stop secured to the bearing $r'$.

$r^3$ is a brake-shoe secured to the shaft $P^3$ and designed to come in contact with the band $r^4$, held on the end of the bar $r^5$, attached to or forming part of the bracket $v^3$.

Figure 4:
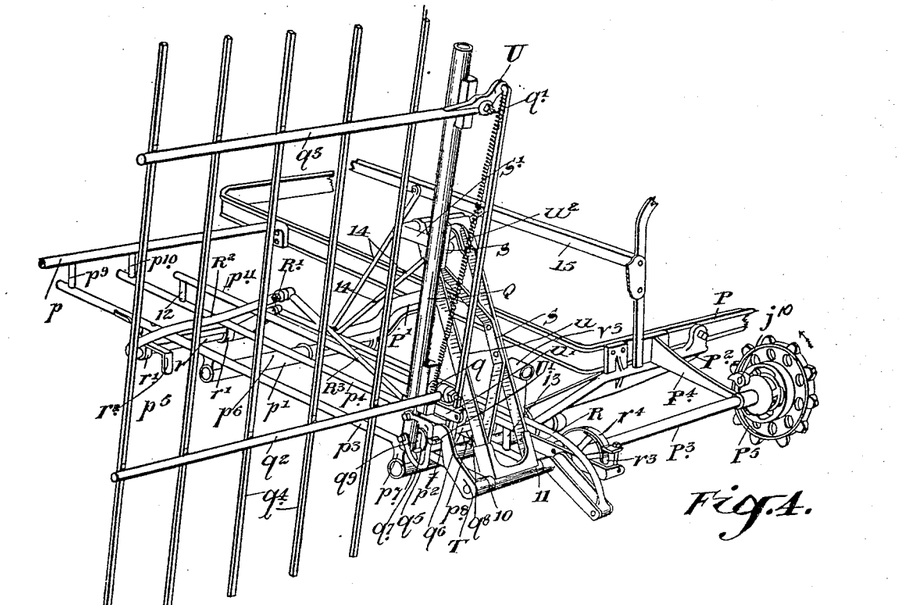
Fig. 4 is a perspective view of the shock-carrier and portion of the frame to which the same is connected with the shock-carrier tilted, so as to deliver the shock.
Figure 6:
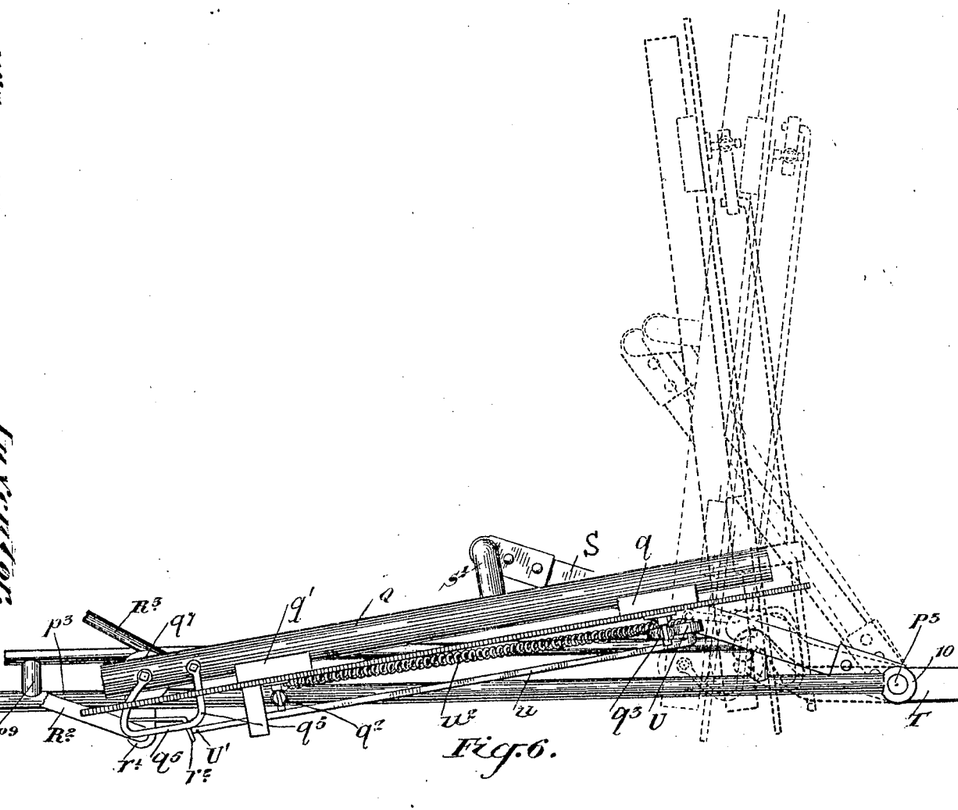
Fig. 6 is an enlarged outside elevation of the mechanism of the shock-carrier, the cross-bar of the shock-carrier being shown in section and the different positions in operating the shock-carrier in precipitating and setting the shock, and folding the shock-carrier, in heavy and light dotted lines, respectively.

I shall now describe the operation of the various parts immediately referred to above. When the shock-knotter shaft has been set in motion in the manner hereinbefore described, it conveys such motion by means of the sprocket-wheel V and chain $v$ and sprocket-wheel V' to the trip-spindle $v'$, which is caused to rotate in the direction indicated by arrow, Fig. 1, until the laterally-extending face-tooth $V^3$ comes in contact with the end of the bell-crank $P^6$, thereby forcing the opposite end of the bell-crank laterally out from engagement with the trip-dog $j^{10}$ coacting with the sprocket-wheel $P^5$, and thus throwing the collar J on the shaft $P^3$ into connection with the sprocket-wheel $P^5$. As the sprocket-wheel $P^5$ is suitably driven from the main drive-wheel by means which it is not necessary here to describe, it will be seen that as the sprocket-wheel is continually rotating such throwing out of the bell-crank $P^6$ will cause such sprocket-wheel to turn the shaft $P^3$, thereby drawing, by means of the rod R and pitman $R^3$, the bar Q rearwardly, such bar being supported at the front end by the wheels $q^7$ and $q^8$, as hereinbefore described, upon the rails $p^3$ and $p^4$. As the bar Q is forced rearwardly it will, on account of its connection to the rectangular frame S, hereinbefore referred to, by the crank S', necessarily rise at the rear end and also cause the forward end of the rectangular frame S to rise until the shock-carrier assumes the upright position shown in full lines in Fig. 4 and in heavy dotted lines in Fig. 6, at which time the shock is delivered. The crank of the shaft $P^3$ then having nearly reached the limit of its stroke, the arm T, being substantially oppositely set to such crank, will in its rotation strike the bent end of the bar $u$ immediately after the shock-carrier has reached the position shown in Fig. 4, and thereby pull down upon the bracket U and fold such shock-carrier on its pivotal bearings $q$ and $q'$ on the bar Q, so as to throw it up into the position shown in full lines in Fig. 5 and light dotted lines in the side elevation of Fig. 6. In this folded position the shock-carrier will be held by the spiral spring $u^2$, connected to the bracket U and to the forward pivot-point of the carrier, until the shock delivered has been passed by the binder as it is being driven forward. As the shaft $P^3$ still continues to rotate, the crank of the shaft necessarily throws forward by the rods and pitmen hereinbefore described the forward, now lower, end of the shock-carrier, such forward end being carried by the wheels hereinbefore referred to on the rails until the carrier is forced into the position shown in Figs. 1 and 2, which is substantially horizontal or, more accurately, with a slight incline downwardly at the front. As the shock-carrier is carried forward the bent end U' of the bar $u$, which at the beginning of the return movement passes quickly past the arm T, strikes the stop $r^2$, and thereby throws back the bars $q^3$ and $q^4$ to a position at right angles to the bar Q, and thus spreads the carrier ready to receive the next shock. The brake-shoe $r^3$ on the return movement also serves to act as a brake on the band $r^4$, so as to prevent a too precipitate or sudden return of the carrier to the normal position ready to receive the shock. It will of course be understood that the driving-shaft $P^3$ is immediately thrown out of clutch with the sprocket $P^5$ as soon as it has been restored to position to receive the next shock, and it will also be understood that such mechanism is so timed that it is not started in its operation by the trip-wheel until the cord of the shock has been tied and severed—in other words, until the shock is complete and ready for delivery.

What I claim as my invention is—

1. In a machine of the class described, the combination with the binder-deck, of a bar extending lengthwise thereof, a knotter-shaft located parallel therewith and carrying ejector-arms, arms extending from said bar to the opposite side of the knotter-shaft, a supplemental shaft journaled in said arms with means for operating it, and supplemental ejector-arms carried by said supplemental shaft, substantially as described.

2. In a machine of the class described, the combination with the binder-deck, and the knotter-shaft carrying ejector-arms, of a bar extending lengthwise of the binder-deck on one side of the knotter-shaft, arms extending from said bar to the opposite side of the knotter-shaft, bearings in the ends of the arms, a supplemental shaft journaled in said bearings, supplemental ejector-arms on said supplemental shaft, a crank-arm on the supplemental shaft, and a pitman connected to said crank-arm with means for operating the pitman, substantially as described.

3. In a machine of the class described, the combination with the binder-deck and the knotter-shaft carrying ejector-arms, of a bar extending lengthwise of the binder-deck on one side of the knotter-shaft, arms extending from said bar to the opposite side of the knotter-shaft, bearings in the ends of the arms, a supplemental shaft journaled in said bearings, supplemental ejector-arms on said supplemental shaft, a crank-arm on the supplemental shaft, and a pitman connected to said crank-arm, a spindle located above the knotter-shaft having an end crank connected to said pitman and means for driving said spindle, substantially as described.

4. In a machine of the class described, the combination with the binder-deck and the knotter-shaft carrying ejector-arms, of a bar extending lengthwise of the binder-deck on one side of the knotter-shaft, arms extending from said bar to the opposite side of the knotter-shaft, a supplemental shaft journaled in bearings in said arms, supplemental ejector-arms carried by said supplemental shaft, a crank-arm on said supplemental shaft, a spindle located above the knotter-shaft having a crank-arm, a rod or pitman connecting said crank-arm with the arm on the supplemental shaft, and means for driving said spindle, substantially as described.

5. In a machine of the class described, the combination with the binder-deck and the knotter-shaft carrying ejector-arms, of a bar extending lengthwise of the binder-deck on one side of the knotter-shaft, arms extending from said bar to the opposite side of the knotter-shaft, a supplemental shaft journaled in bearings in said arms, supplemental ejector-arms carried by said supplemental shaft, a crank-arm on said supplemental shaft, a spindle located above the knotter-shaft having a crank-arm, a rod or pitman connecting said crank-arm with the arm on the supplemental shaft, and means for driving said spindle, comprising a sprocket-wheel on the end of the spindle, a packer-shaft, a sprocket-wheel on the end thereof, and a sprocket-chain connecting said sprocket-wheels, substantially as described.

6. In a device of the class described, the combination with the binder-deck, of a knotter-shaft above the deck, ejector-arms carried by said knotter-shaft, a supplemental shaft arranged parallel with the knotter-shaft with means for supporting it, supplemental ejector-arms carried thereby a crank-arm on the supplemental shaft, a spindle provided with a crank-arm, a rod connecting said crank-arms, a gear-wheel for rotating the spindle and means for controlling the movement of said spindle, substantially as described.

7. In a device of the class described, the combination with the binder-deck, of a knotter-shaft above the deck, ejector-arms carried by said knotter-shaft, a supplemental shaft arranged parallel with the knotter-shaft with means for supporting it, a crank-arm on the supplemental shaft, a spindle provided with a crank-arm, a rod connecting said crank-arms, a sprocket-wheel on the end of the spindle, a packer-shaft, a sprocket-wheel thereon, and a sprocket-chain connecting said sprocket-wheels, substantially as described.

8. In a machine of the class described, the combination with the binder-deck and knotter-shaft carrying the ejector-arms, of a supplemental shaft carrying supplemental ejector-arms with means for oscillating said shaft, and retaining-arms pivoted on said supplemental shaft, a spring tending normally to depress said arms and means for holding said arms elevated against the tension of the spring, substantially as described.

9. In a machine of the class described, the combination with the binder-deck and knotter-shaft carrying ejector-arms, of a supplemental shaft carrying supplemental ejector-arms, means for oscillating said shaft, sheaf-retaining arms pivotally supported on said supplemental shaft, a spring tending normally to depress said arms, and manually-controlled means for holding said retaining-arms elevated against the tension of the spring, substantially as described.

10. In a machine of the class described, the combination with the binder-deck and knotter-shaft carrying ejector-arms, of a supplemental shaft carrying supplemental ejector-arms, means for oscillating said shaft, sheaf-retaining arms pivotally supported on said supplemental shaft, a spring tending normally to depress said arms, and manually-controlled means for holding said retaining-arms elevated against the tension of the spring, said means including a crank-arm connected with one of the arms and a cord connected to said crank-arm and extending into reach of the operator, substantially as described.

11. In a machine of the class described, the combination with the binder-deck and knotter-shaft, of a supplemental shaft located above the deck and parallel with the knotter-shaft with means for operating it, ejector-arms carried by said supplemental shaft for ejecting the sheaves, retaining-arms connected to move in unison and pivotally mounted on said supplemental shaft, an arm pivoted on the shaft and connected to one of the retaining-arms, a spring acting on said arm and tending to depress the retaining-arms, and manually-controlled means for normally holding said retaining-arms elevated against the tension of the spring, substantially as described.

12. In a machine of the class described, the combination with the binder-deck and knotter-shaft, of a supplemental shaft located above the deck and parallel with the knotter-shaft with means for operating it, ejecting-arms carried by said supplemental shaft for ejecting the sheaves, retaining-arms connected to move in unison and pivotally mounted on said supplemental shaft, an arm pivoted on the shaft and connected to one of the retaining-arms, a pin on said arm, a spring acting on said pin and tending to depress the retaining-arms, a cord connected to the said arm, and means for holding the end of the cord, substantially as described.

In a machine of the class described, the combination with the binder-deck and knotter-shaft, of a supplemental shaft located above the deck and parallel with the knotter-shaft with means for operating it, ejecting-arms carried by said supplemental shaft for ejecting the sheaves, retaining-arms connected to move in unison and pivotally mounted on said supplemental shaft, an arm pivoted on the shaft and connected to one of the retaining-arms, a pin on said arm, a spring acting on said pin and tending to depress the retaining-arms, a cord connected to the said arm, and means for holding the end of the cord, said means comprising a forked arm on the frame and stops on the cord for engaging said fork, substantially as described.

14. In a machine of the class described, the combination with the binder-deck, of an apron angular in cross-section having one edge secured to the lower edge of the binder-deck, and having slots to permit operating mechanism to project therethrough, substantially as described.

15. In a machine of the class described, the combination with the binder-deck, of an apron angular in cross-section having one edge secured to the lower edge of the binder-deck and having slots to permit operating mechanism to project therethrough, and a second apron secured to the outer edge of said first-named apron, substantially as described.

16. In a machine of the class described, the combination with the binder-deck, of an apron angular in cross-section having one edge secured to the edge of the binder-deck and forming a continuation thereof, said apron having slots, a second apron secured to the opposite edge of said apron, a vertically-disposed apron secured to the angular apron at one end, and an additional vertical apron carried by the frame and in the plane of said first vertical apron, substantially as described.

17. In a machine of the class described, the combination with the binder-deck and sheaf binding and ejecting mechanism, of a horizontally-disposed receiving-apron secured to the lower edge of the binding-deck, a second apron secured to the outer edge of said receiving-apron, vertically-disposed aprons at the end of said receiving and said second aprons, and shock-binding mechanism, substantially as described.

18. In a machine of the class described, the combination with the binder-deck and sheaf binding and ejecting mechanism, of a horizontally-disposed receiving-apron secured to the lower edge of the binding-deck, a second apron secured to the outer edge of said receiving-apron, vertically-disposed aprons at the end of said receiving and said second aprons, means for compressing and binding the grain and a suitable shock-carrier, substantially as described.

19. In a shocker, the combination with the counter-shaft and knotter-shaft and arms located on the counter-shaft outside of the knotter-shaft and the spindle and driving connections between the spindle and counter-shaft, of the sprocket-wheel on the spindle, a clutch mechanism connecting said sprocket-wheel and said spindle and provided with a dog a packer-shaft and driving connection between such sprocket-wheel and the packer-shaft, a lever suitably pivoted in the frame and having one end designed to engage with said dog and means for tilting such lever, so as to free the dog and allow the sprocket-wheel and mechanism driven therefrom to operate and deliver the sheaf as and for the purpose specified.

20. In a shocker, the combination with the counter-shaft knotter-shaft and packer-shaft and arms located on the counter-shaft outside of the knotter-shaft and the spindle and driving connections between the spindle and counter-shaft, of the sprocket-wheel on the spindle, a clutch mechanism between said sprocket-wheel and said spindle and driving connection between such sprocket-wheel and the packer-shaft, a lever suitably pivoted in the frame a dog on the clutch mechanism designed to be engaged by one end of said lever, a rod supported on the binder-deck and extending longitudinally thereof and an arm on the front end of the rod and a rod connecting such arm with the lever aforesaid and means for oscillating the rod by the delivery of the sheaf as and for the purpose specified.

21. In a shocker, the combination with the counter-shaft knotter-shaft and packer-shaft and arms located on the counter-shaft outside of the knotter-shaft and the spindle and driving connections between the spindle and counter-shaft, of the sprocket-wheel on the spindle, a clutch mechanism between said sprocket-wheel and said spindle a dog on said clutch mechanism and driving connection between such sprocket-wheel and the packer-shaft, a lever suitably pivoted in the frame and having one end designed to engage with said dog, a rod supported on the binder-deck and extending longitudinally thereof and an arm on the front end of the rod and a rod connecting such arm with the lever aforesaid, an arm on the opposite end of the longitudinally-supported rod and means for depressing such arm operated by the delivery of the sheaf as and for the purpose specified.

22. In a shocker, the combination with the counter-shaft knotter-shaft and packer-shaft and arms located on the counter-shaft outside of the knotter-shaft and the spindle and driving connections between the spindle and counter-shaft, of the sprocket-wheel on the spindle, a clutch thereon having a dog, and driving connections between such sprocket-wheel and the packer-shaft, a lever suitably pivoted in the frame and having one end designed to engage with said dog, a rod supported on the binder-deck and extending longitudinally thereof and an arm on the front end of the rod and a rod connecting such arm with the lever aforesaid, an arm on the opposite end of the longitudinally-supported rod, for the purpose specified.

23. In a shocker, the combination with the bar I' suitably pivoted in the binder-deck and the double arm or dog pivotally secured on the outer end thereof and spring-held, of a counter-wheel suitably journaled and having ratchet-teeth engaged by the dog and the ejector-arm arranged in proximity to the upper arm of said dog and means for moving the ejector-arm to cause it to engage said upper arm and to throw the dog downwardly and move the ratchet-wheel the space of one tooth upon the delivery of every sheaf, substantially as described.

24. In a shocker, the combination with the shock knotter-shaft supported on the binder-deck and the sprocket-wheel loosely supported on the shaft and provided with a collar having a series of teeth in its periphery, of an internal collar provided with an arm spring-held and a dog pivoted on the end of the arm, such arm being normally out of the path of the teeth, a counter-wheel, means for rotating such counter-wheel, a face-tooth extending laterally from the counter-wheel, a bar supported in suitable guideways in the frame and designed to normally extend underneath the dog supported on the arm pivoted in the collar aforesaid, said bar having a bent end, a lever pivoted on the frame and secured to the bent end of the bar, a spring for normally holding the bent end of the bar to the frame, the said lever being designed to be thrown outwardly by the tooth on the face of the counter-wheel on said counter-wheel completing its revolution, so as to release the dog and bind the sprocket-wheel to the shaft as and for the purpose specified.

25. In a sheaf-compressor, the combination with the compressor-arm supported on a suitable shaft and suitably operated, of a bar normally held in proximity to the compressor-arm and means for throwing such bar underneath the compressor-arm when the shock is being bound as and for the purpose specified.

26. In a sheaf-compressor, the combination with the compressor-arm supported on a suitable shaft and suitably operated, of a bar located in proximity to the compressor-arm and provided with a bent end and roller, a supporting-bracket for the same a pin on the bar, a spiral spring encircling the bar and extending between the pin on the same and the bracket, a knotter-shaft, and a cam-wheel thereon provided with a face-cam and designed to coact with the roller on the end of the bar as and for the purpose specified.

27. In a shocker, the combination with the binder-deck, of a shock-knotter and shaft, means for driving the same from the binder mechanism, a rectangular extension-frame located at the front of the machine and swung on the knotter-shaft, a brace supporting the same, a needle-arm journaled on the outer edge of said frame, crank-arms on said needle-arm and said knotter-shaft and a link connecting said arms, substantially as described.

28. In a machine of the class described, the combination with the shock-carrier and means for delivering sheaves thereto, of a rocking shaft in proximity to the shock-carrier, a sleeve forming a bearing for said shaft, said sleeve being capable of a lateral swinging motion, a plurality of compressor-arms extending upward from said shaft, a needle-arm, and connections for rocking said shaft as the needle-arm moves forward, as and for the purpose specified.

29. In a shocker, the combination with the shock-carrier suitably supported on the frame, of the compressor-arms, the shaft carrying the same, the needle-arm, a suitable support for the compressor-arms shaft, means operated from the needle-arm for throwing the compressor-arms on the shock when the needle-arm moves forwardly and a spiral spring connecting the needle-arm with the compressor-arm shaft as and for the purpose specified.

30. In a shocker, the combination with the shock-carrier suitably supported on the frame, of the compressor-arms, the shaft carrying the same, the needle-arm, a suitable support for the compressor-arms shaft, arms on the compressor-arms shaft and rods connecting the arms to the needle-arm for moving the compressor-arms downwardly upon the inward movement of the needle as and for the purpose specified.

31. In a shocker, the combination with the main frame, the extension-frame located at the front of the machine and the shock-carrier, of the needle-arm journaled on the outer end of the extension-frame, the braces extending outwardly and downwardly from the extension-frame, a journal supported thereby at the outside of the shock-carrier, a rock-shaft mounted to rock in said journal, compressor-arms suitably secured to said shaft and means for imparting a rocking motion to said shaft when the needle-arm is caused to move inwardly, substantially as described.

32. In a shocker, the combination with the main frame, the extension-frame located at the front of the machine and the shock-carrier, of the needle-arm journaled on the outer end of the extension-frame, the braces extending outwardly from the extension-frame, a journal supported thereby at the outside of the shock-carrier, a rock-shaft mounted to oscillate in said journal, compressor crank-arms suitably secured to the compressor-arms shaft, arms on the compressor-arms shaft, a rod connecting one of the crank-arms to the needle-arm, an arm on the end of the needle-arm and a rod connecting the second crank-arm to such latter arm as and for the purpose specified.

33. In a device of the character described, a shock-carrier, means for delivering sheaves thereto to form a shock, and means for moving said shock-carrier longitudinally and elevating it to deliver the shock and for folding it, substantially as described.

34. In a device of the character described, a shock-carrier comprising a folding frame, suitable means for supporting the same, means for delivering sheaves thereto, and means for moving said frame longitudinally and tilting and folding it, substantially as described.

35. In a shocker, a main frame, longitudinal rails supported thereby, trucks adapted to travel on said rails, a longitudinal bar connected to said trucks, bars extending horizontally from said longitudinal bar and a plurality of longitudinal shock-supporting bars secured to said horizontal bars, substantially as described.

36. In a shocker, a shock-carrier comprising the inner side bar, the laterally-extending bars, pivotal connections between the laterally-extending bars and the inner bar, the longitudinal bars pivotally connected to the laterally-extending bars, the extension-arm secured to the rearmost laterally-extending bar and means for throwing such arm down, so as to tilt the laterally-extending bars to lie substantially parallel with the inner side bar when the inner side bar is raised to the substantially vertical position and means for swinging said inner side bar to a vertical position as and for the purpose specified.

37. In a shocker, a shock-carrier comprising the inner side bar, the laterally-extending bars, pivotal connections between the laterally-extending bars and the inner bar, the longitudinal bars pivotally connected to the laterally-extending bars, the extension-arm secured to the rearmost laterally-extending bar, a bar pivotally connected to the extension-arm of the laterally-extending bar, suitable guideways in the carrier-frame for the same and means for operating the aforesaid bar, so as to fold the shocker as and for the purpose specified.

38. In a shocker, a shock-carrier comprising the inner side bar, the laterally-extending bars, pivotal connections between the laterally-extending bars and the inner bar, the longitudinal bars pivotally connected to the laterally-extending bars, the extension-arm secured to the rearmost laterally-extending bar, a bar having one end bent at an angle and the opposite end pivotally connected to the extension-arm of the lateral bar, suitable guides in the carrier-frame for the same, the operating-shaft suitably journaled on brackets on the frame, and the arm on the end of the operating-shaft provided with a notch as shown and for the purpose specified.

39. In a shocker, a shock-carrier comprising the inner side bar, the laterally-extending bars, pivotal connections between the laterally-extending bars and the inner bar, the longitudinal bars pivotally connected to the laterally-extending bars, the extension-arm secured to the rearmost laterally-extending bar, a bar having one end bent at an angle and its opposite end pivotally connected to the extension of the lateral arm, suitable guides in the carrier-frame for the same, the operating-shaft suitably supported, the arm on the end of the operating-shaft provided with a notch and a guide on the inner side bar of the shock-carrier as and for the purpose specified.

40. In a shocker, the combination with the shock-carrier and supporting-rails suitably supported, of a carriage for supporting the front end of the shock-carrier on the rails, an operating-shaft provided with a suitable crank, a counter-shaft provided with an arm at one end, a pitman connecting such arm with the crank on the operating-shaft, an arm on the outer end of the counter-shaft and a pitman or rod connecting such arm to said carriage as and for the purpose specified.

41. In a shocker, the combination with a suitable carriage and a shock-carrier pivotally connected to the carriage at one end, of means for throwing the carriage rearwardly, an operating-shaft a frame suitably supported on the operating-shaft and provided at the end with a crank-arm pivotally connected to the center of the shock-carrier as and for the purpose specified.

42. In a shocker, the combination with the shock-carrier and the carriage supporting the front end thereof at the inside, of the operating-shaft, the frame supported thereon, the crank-arm having a pivotal connection to the side of the shock-carrier frame and the end of the frame supported on the operating-shaft as and for the purpose specified.

43. In a shocker, the combination with the shock-carrier and means for supporting and elevating the same and causing it to recede rearwardly, of the operating-shaft and a brake-shoe secured thereon and a band with which such brake-shoe comes in contact as and for the purpose specified.

44. In a shocker, the combination with the shock-carrier, the driving-shaft therefor and the knotter-shaft, of a sprocket drive-wheel loose on the shaft, clutch mechanism coacting therewith and provided with a releasing-dog, a trip-spindle, means connected to the knotter-shaft for driving the same, a face-wheel on said trip-spindle, a tooth on said face-wheel, and a bell-crank having one end adapted to normally engage said dog and the opposite end adapted to be engaged by the tooth on said face-wheel and to release the dog on said clutch mechanism, substantially as described.

45. In a shocker, the combination with the shock-carrier and drive-shaft, of a sprocket drive-wheel loose on the shaft, clutch mechanism coacting therewith and provided with a releasing-dog, a bell-crank designed to coact with the dog and spring-held, the shock knotter-shaft, a spindle located thereunder driving means between the knotter-shaft and the spindle and a face-wheel on the spindle provided with a tooth designed to come in contact with the end of the bell-crank as and for the purpose specified.

JAMES CALDER.

Witnesses:
B. BOYD,
L. TRIMBLE.